(12) United States Patent
Roache et al.

(10) Patent No.: US 8,306,923 B1
(45) Date of Patent: Nov. 6, 2012

(54) SYSTEMS AND METHODS FOR CERTIFYING BUSINESS ENTITIES

(75) Inventors: Neil Roache, Norcross, GA (US); Alan Amling, Marietta, GA (US)

(73) Assignee: United Parcel Service of America, Inc.

( * ) Notice: Subject to any disclaimer, the term of this patent is extended or adjusted under 35 U.S.C. 154(b) by 453 days.

(21) Appl. No.: 12/573,495

(22) Filed: Oct. 5, 2009

Related U.S. Application Data (60) Provisional application No. 61/104,470, filed on Oct. 10, 2008.

(51) Int. Cl.
*G06Q 30/00* (2012.01)

(52) U.S. Cl. ...................................... 705/341

(58) Field of Classification Search .................. None
See application file for complete search history.

(56) References Cited

U.S. PATENT DOCUMENTS

| | | | |
|---|---|---|---|
| 6,523,021 B1 | 2/2003 | Monberg et al. | |
| 7,114,177 B2* | 9/2006 | Rosenberg et al. | 726/4 |
| 7,552,466 B2* | 6/2009 | Rosenberg et al. | 726/4 |
| 7,797,199 B2* | 9/2010 | Forshaw et al. | 705/26.1 |
| 8,073,785 B1* | 12/2011 | Candella et al. | 705/75 |
| 2002/0152134 A1 | 10/2002 | McGlinn | |
| 2005/0065719 A1* | 3/2005 | Khan et al. | 701/204 |
| 2005/0209913 A1* | 9/2005 | Wied et al. | 705/12 |
| 2007/0185726 A1* | 8/2007 | Stickler et al. | 705/1 |
| 2007/0204025 A1 | 8/2007 | Cox et al. | |
| 2008/0004967 A1* | 1/2008 | Gillen | 705/24 |
| 2008/0120166 A1 | 5/2008 | Fernandez et al. | |
| 2009/0248537 A1* | 10/2009 | Sarkeshik | 705/26 |

OTHER PUBLICATIONS

The World Bank Group; Doing Business; Measuring business regulation; Economy Ratings website; http://www.doingbusiness.org/MethodoloaySurveys/GettingCredit.aspx pp. 1-5; Sep. 23, 2009.
The World Bank Group; Doing Business; Measuring business regulation; Getting Credit Methodology website; http://www.doingbusiness.org/economyrankings/?direction=Asc&sort=6 pp. 1-3; Sep. 23, 2009.

* cited by examiner

*Primary Examiner* — Rutao Wu
(74) *Attorney, Agent, or Firm* — Alston & Bird LLP (57) ABSTRACT

Systems, methods, and computer program products for certifying business entities are provided. Input is received regarding a location of a business entity that is visited as part of a parcel delivery transaction, and the business entity is then associated with a verified address corresponding to the location visited. The verified address and an indication that the business entity is certified may be displayed to a user. Furthermore, a rating indicative of the legitimacy of the business entity may be determined, associated with the business entity, and displayed. The rating may be determined based on a total number of parcel delivery transactions of the business entity, a trend in its delivery transactions, the length of time the business entity has been involved in delivery transactions, or a geographic scope of the business entity. A directory of business entities that includes certification information and other features may also be provided.

35 Claims, 6 Drawing Sheets

SYSTEMS AND METHODS FOR CERTIFYING BUSINESS ENTITIES

CROSS-REFERENCE TO RELATED APPLICATIONS

The present application claims the benefit of U.S. Provisional Application No. 61/104,470, entitled "Systems and Methods for Certifying Business Entities," filed on Oct. 10, 2008, the contents of which are incorporated herein in their entirety.

TECHNOLOGICAL FIELD

Embodiments of the present invention relate generally to the provision of verified directory information regarding business entities and, more particularly, relate to systems, methods, and computer program products for verifying the address of a business entity and providing other information regarding the legitimacy of the business entity.

BACKGROUND

Increasingly, consumers and businesses are turning to the Internet for information regarding products and services that interest them. Search engines are used to identify merchants, suppliers, distributors, and manufacturers, to competitively price the desired goods or services, and to locate the facilities of the corresponding businesses. Likewise, purveyors of goods and services recognize the need for their businesses to have an Internet presence in order to compete in the marketplace.

With the prevalence of websites and Internet listings comes the risk that not all business information found on the Web is genuine. For example, some fly-by-night businesses may provide fraudulent information, preying on customers who are enticed by their low prices. Other businesses may be genuine, but may misrepresent themselves as global enterprises or as having large production capacities. Furthermore, many companies that are genuine and honest may be hurt indirectly by the misbehavior of other businesses. For example, an honest business entity that only operates on the Web and, as such, lacks a brick-and-mortar store be mistaken for a fraudulent or dishonest enterprise by those who don't know any better and who have previously been victims of fraudulent Internet business dealings.

Thus, there is a need for certifying business entities in an efficient and cost-effective manner and providing the certified information to users in an easy-to-use format.

BRIEF SUMMARY

Systems, methods, and computer program products are therefore provided for certifying a business entity, particularly in the course of conducting parcel delivery activities. In this way, drivers of a fleet of parcel delivery vehicles may collect information regarding business entities that are either involved in a parcel delivery transaction (e.g., as shippers or consignees) or are accessible to the drivers as the drivers complete their scheduled delivery routes. Based on the information collected, the validity of the business entities may be determined, and a verified address of each business entity and/or a legitimacy rating may be determined by the common carrier and provided to users via an interactive business directory.

In one exemplary embodiment, a system for certifying a business entity is provided. The system includes a database connected to a communications network and configured to store a plurality of data entries regarding parcel delivery transactions. Each data entry includes at least one item of information, such as a shipper name, a shipper address, a consignee name, and/or a consignee address associated with a respective parcel delivery transaction. The system further includes at least one data terminal, which is connected to the communications network and is configured to receive and transmit input verifying an address as a result of the parcel delivery transaction, and a central server connected to the communications network and configured to access the database. The central server is configured to associate the verified address with the corresponding business entity based on the data entries accessed from the database. In some cases, at least one of the data terminals is a Delivery Information Acquisition Device (DIAD).

The system may also include a directory server and a user terminal. The directory server may be connected to the communications network and may be configured to store information regarding a plurality of business entities. The user terminal may be connected to the communications network and may be configured to receive search criteria, wherein the user terminal is configured to communicate with the directory server to display a list of business entities according to the criteria. Furthermore, the user terminal may be configured to communicate with the central server to display an indication of the verified address for each certified business entity displayed. In some cases, a user is able to interact with the user terminal to select at least one of the certified business entities displayed, and selection of the certified business entity causes the display of additional information regarding the selected business entity.

In some embodiments, the central server is further configured to determine a rating indicative of the legitimacy of the business entity. The rating may be determined based on (1) a total number of parcel delivery transactions involving the business entity over a predetermined period of time; (2) a trend in the parcel delivery transactions involving the business entity over a predetermined period of time; (3) a length of time over which the business entity has been involved in parcel delivery transactions; (4) a geographic scope of the business entity based on a location of at least one entity with which the business entity has engaged in at least one parcel delivery transaction; or a combination of any of these factors, among others. For example, the trend of an increasing volume of parcel delivery transactions may correspond to a rating indicating a greater legitimacy of the business entity. Similarly, the trend of an increasing frequency of parcel delivery transactions may correspond to a rating indicating a greater legitimacy of the business entity.

The central server, in some cases, may be configured to access the database to determine the rating. In other cases, the central server may be configured to access at least one supplementary server to determine the rating. Furthermore, the user terminal may be configured to receive a preference from the business entity regarding the display of the respective business entity's rating, and the central server may be configured to provide for a display of the respective business entity's rating via the user terminal according to the preference.

In another exemplary embodiment, a method and computer program product for certifying a business entity are provided. The method and computer program product receive input regarding a location of the business entity visited as part of a parcel delivery transaction and associate the business entity with a verified address corresponding to the location visited. In some cases, the input is received via a DIAD. In addition, the parcel delivery transaction may pertain to an entity other than the business entity being certified.

In some embodiments, the method and computer program product provide for a display of the verified address and for a display of an indication that the business entity has been certified. The indication may include, for example, at least one of an icon, a link to the business entity's website, and a listing of additional information regarding the business entity.

The method and computer program product may further determine a rating indicative of a legitimacy of the business entity, associate the business entity with the rating, and provide for a display of the rating. The rating may by determined by accessing information regarding parcel delivery transactions involving the business entity. Furthermore, a total number of the parcel delivery transactions involving the business entity over a predetermined period of time may be calculated to determine the rating. In some cases, the predetermined period of time is a total length of time over which the business entity has been conducting business. In other cases, a trend in the parcel delivery transactions involving the business entity over a predetermined period of time is determined. The length of time over which the business entity has been receiving parcels or delivering parcels via at least one common carrier may further be determined. Furthermore, a geographic scope of the business entity based on a location of at least one entity with which the business entity has engaged in at least one parcel delivery transaction may be determined. The geographic scope may be determined based on the number of cities, states, or countries in which the entity with which the business entity has engaged in parcel delivery transactions is located. In addition, display of the rating may involve receiving input from the business entity regarding whether to display the rating.

In another embodiment, a method of certifying business entities is provided in which data is collected regarding the business entities from drivers of a fleet of parcel delivery vehicles associated with a common carrier. The drivers generally obtain the data while conducting parcel delivery activities for the common carrier. A validity of at least one of the business entities may then be determined based on the data received.

The data collected may include various types of information. For example, the data may include verification of the address of a business entity or a photograph of a storefront of the respective business entity that is taken by at least one of the drivers. The data may further include data regarding parcel deliveries to or from a respective business entity using the common carrier. In some cases, the data may be collected by the drivers via handheld wireless devices.

In some embodiments, the validity is determined by analyzing data collected over a period of time regarding the business entity. In other embodiments, a business directory is provided that includes a listing of the certified business entities and an indication of the validity of at least one of the certified business entities

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The systems, methods, and computer program products of embodiments of the present invention provide for certifying business entities such that certification provides information regarding the legitimacy or validity of the business entity. In some embodiments, input is received regarding a location of a business entity visited as part of a parcel delivery transaction. The business entity is then associated with a verified address that corresponds to the location visited. In this way, a user can have some assurance that the verified address is an address that exists and represents a location at which the business entity has received deliveries. In other embodiments, the business entity is also associated with a rating that is indicative of the legitimacy of the business entity. The rating may take into account, for example, the number of parcel delivery transactions that have involved the business entity over a certain time period, recent trends in parcel deliveries to and/or from the business entity, the length of time over which the business entity has been involved in parcel delivery transactions, as well as the geographic scope of the business entity's transactions, among others. Such information may be provided as part of a computer application, and a user may be able to interact with the application via a web-based interface.

A business entity may be, for example, a business of any size that buys and/or sells goods or services. Such business entities may be, for example, a large-scale manufacturer or distributor of parts, or a single individual, such as a graphic designer working from home. The business entity may have a brick-and-mortar location at which the goods or services are bought or sold, it may conduct business over the Internet, by mail, or over the phone, or it may do all of these. The business entity may be for profit, not-for-profit, an educational institution, a religious institution, or any other type of enterprise.

In many cases, the business entity is either a shipper or a consignee in a parcel delivery transaction. As a shipper, the business entity would be sending a parcel (such as a letter, a package, or a large shipment) to a consignee, who may also be a business entity. The parcel delivery transaction (e.g., the process of delivering the parcel, from the time the parcel leaves the possession of the shipper to the time the parcel is taken into possession by the consignee) may occur in any manner, such as by airplane, ship, truck, or a combination of these, and may involve one or more common carriers. In this regard, a common carrier is commissioned to deliver the parcel from the shipper to the consignee.

Figure 1:
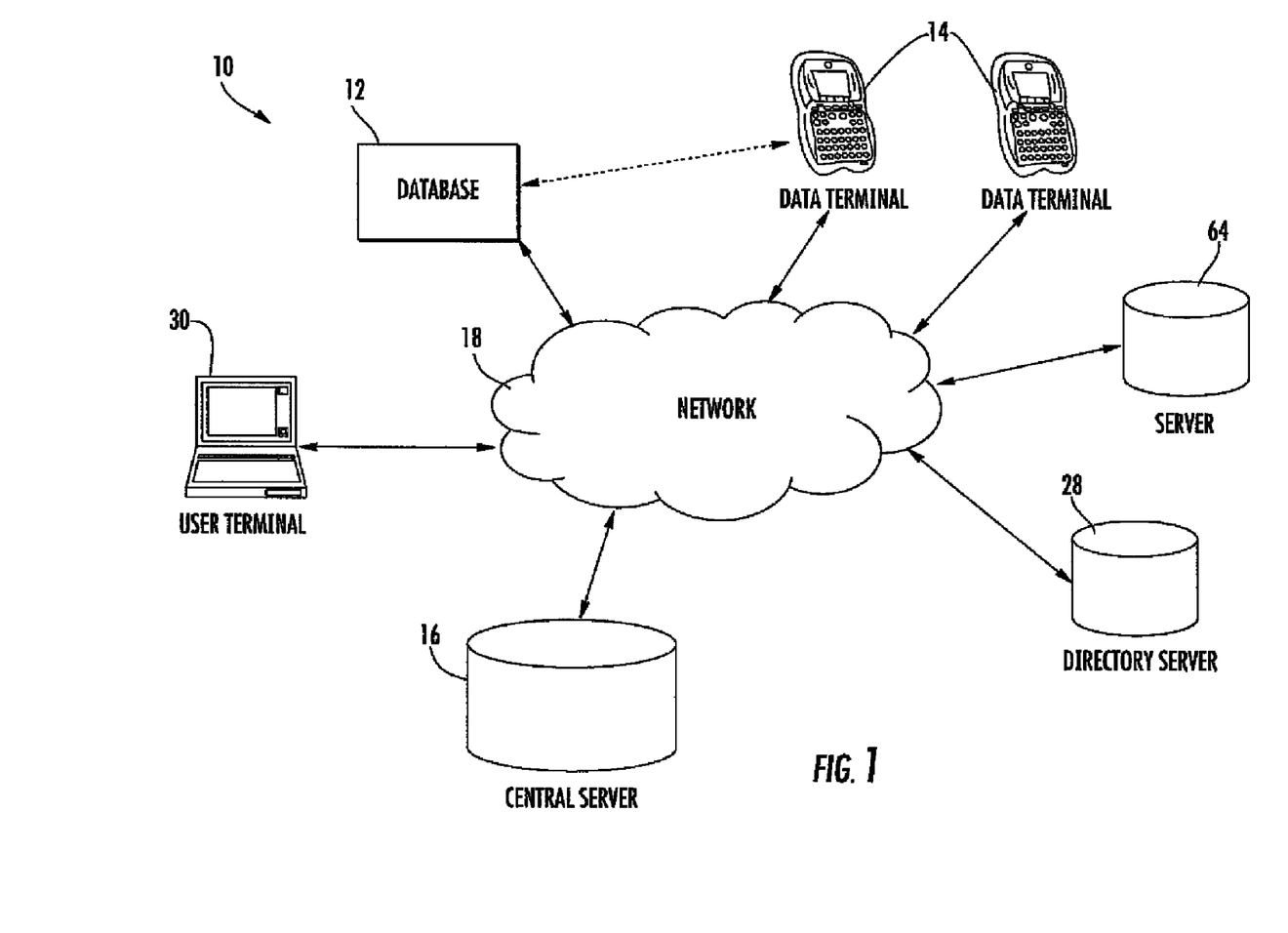
FIG. 1 is a network diagram of a system for certifying a business entity via a network according to an exemplary embodiment of the present invention.

Referring to FIG. 1, a system 10 is provided for certifying a business entity. The system 10 may include a database 12, one or more data terminals 14, and a central server 16, all of which are connected to a communications network 18, such as via internal communications, the Internet, intranet, or other network. The database 12 may be configured to store a number of data entries regarding parcel delivery transactions. For example, the database 12 may include or be in communication with a memory (not shown), such as volatile and/or non-volatile memory. Each data entry stored in the database 12 may include at least one item of information regarding a parcel delivery transaction, such as a shipper name, a shipper address, a consignee name, and a consignee address. The data entry may include other items of information, as well, such as the date of pick-up or the date of delivery of the parcel.

Each data terminal 14 may be configured to receive and transmit input verifying an address as a result of a parcel delivery transaction, as described below. The data terminal 14 may be a computer, such as a desktop or laptop computer, a cellular telephone, a barcode scanner, a personal digital assistant (PDA), an electronic signature pad, a handheld device such as a Delivery Information Acquisition Device (DIAD), or any other device configured to receive input either directly or indirectly from a user. In this regard, the data terminal 14 in some cases may communicate with other devices to obtain information verifying the address of a business transaction. For example, a DIAD may be used to receive the input from the driver of a parcel delivery truck, and the data may then be communicated wirelessly to a server or database for communication with the network 18. As another example, a cellular telephone may be used by the driver of the parcel delivery truck to send a voice or text message to a server which then stores the information and/or communicates it to other servers and devices connected to the communications network 18, such as the database 12.

The central server 16 may be configured to access the database 12 via the communications network 18 to gain access to data stored in the database 12. In this regard, the central server 16 may include or be in communication with one or more processors (not shown) configured to access and manipulate the data. The central server 16 may therefore be configured to access the database 12 and to associate the verified address with the corresponding business entity based on the data entries accessed. The central server 16 may include a memory component for storing the associated business entity and verified address, or the central server 16 may communicate the associated business entity and verified address to the database 12 for storage. In some cases, the database 12 is included in and forms a part of the central server 16.

Gathering the Data

In particular embodiments, the address of a business entity may become a verified address when the location corresponding to the address has been visited as part of a parcel delivery transaction. In such embodiments, an address may be verified when, through the parcel delivery transaction, the actual existence of the address and the ability of the business entity (e.g., a representative of the business entity) to deliver parcels from and/or receive parcels at the address is confirmed. In other embodiments, the location of the business entity may be visited as part of a parcel delivery transaction pertaining to an entity other than the business entity itself. For example, the driver of a parcel delivery truck may visit the location of the business entity in the process of picking up a parcel from another, different shipper or delivering a parcel to another, different consignee, or on a separate trip that is dedicated to confirming the validity of a particular business address. The driver may thus visually confirm that the business entity's address indeed corresponds to the location of the business entity (e.g., by seeing a sign listing the name of the business entity at the particular location), as described in more detail below.

In some cases, one or more drivers of a fleet of parcel delivery vehicles associated with a particular common carrier may collect data regarding the business entities. The drivers may obtain the data, for example, while conducting parcel delivery activities for the common carrier. For instance, as described below, the drivers may collect the data as they execute their scheduled parcel delivery routes. Drivers may, for example, collect data regarding business entities from which parcels are picked up or to which a parcels are delivered. Furthermore, a driver may pass by a particular business entity en route to a consignee and thus may collect the data without necessarily picking up a parcel from or delivering a parcel to that business entity, or any other nearby entity.

Figure 2:
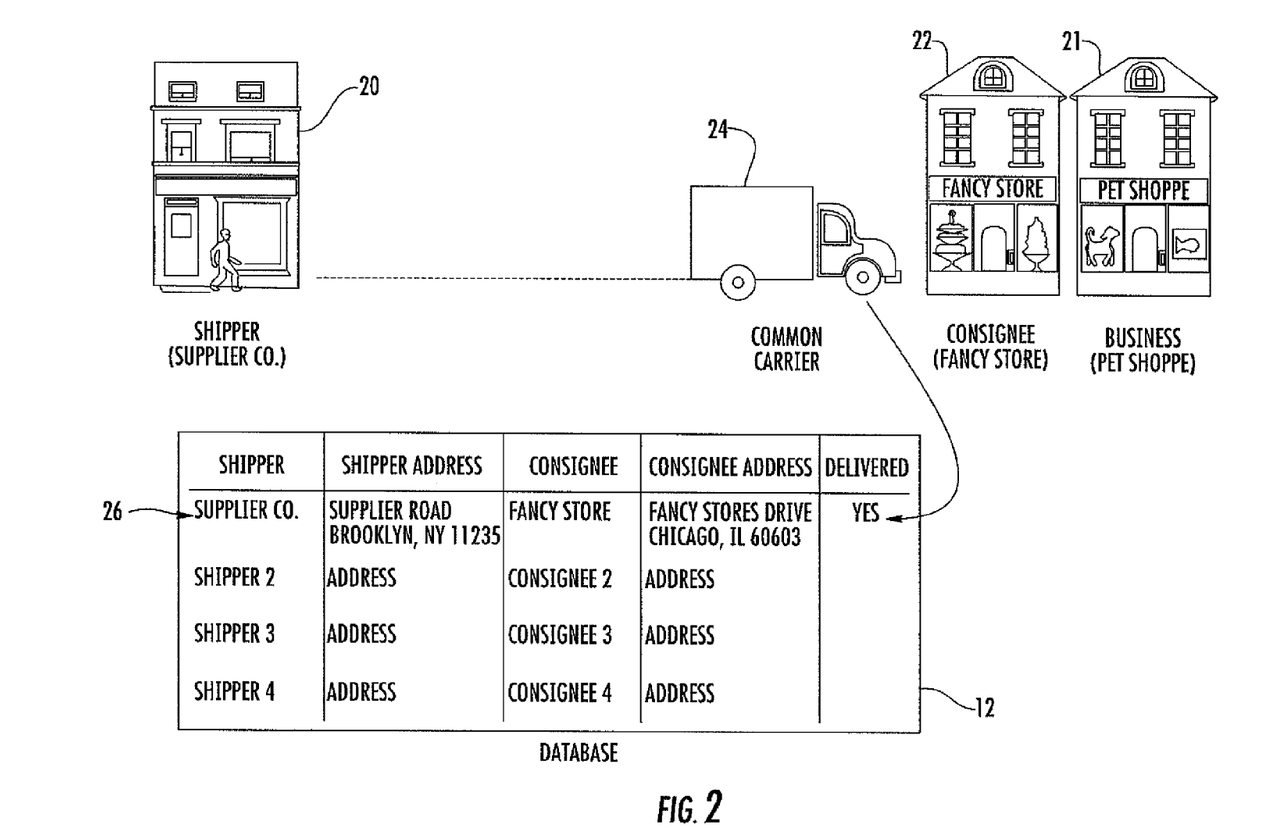
FIG. 2 illustrates a scenario of a parcel delivery transaction according to an exemplary embodiment of the present invention.

Turning to FIG. 2, one example of a scenario in which a business entity is certified may involve a shipper (Supplier Co.) 20, a consignee (Fancy Store) 22, and a common carrier 24. For purposes of illustration, Fancy Store 22 may be a shop that makes and sells chocolates and candies, and Supplier Co. 20 may be a supplier of wrappers and packaging that Fancy Store uses for packaging its candies for sale. In this scenario, Supplier Co. 20 may be shipping a parcel containing 100 cellophane wrappers to Fancy Store 22 to fulfill a contract between the two businesses. Supplier Co. 20 may entrust a common carrier 24 with delivering the parcel. For example, the common carrier 24 may be a commercial common carrier. Supplier Co. 20 may take the parcel to the common carrier 24 for shipment, for example by going to the common carrier's store or drop-off center, or the common carrier 24 may go to Supplier Co.'s place of business to pick up the parcel.

In order to complete the parcel delivery transaction, the common carrier 24 may have, for example, the identity of the shipper, the identity of the consignee, the shipper's address or return address, and the consignee's address. The shipper and/or the consignee may be identified by a name (such as Supplier Co.), code, or other identifier. For example, the common carrier 24 may scan a barcode on the parcel representing the identity of the shipper 20. The information relating to a certain parcel delivery transaction may thus be gathered and communicated to the database 12, where it is stored as a data entry 26. Other information may also be included in the data entry 26, such as an insured value of the parcel, desired class or method of shipment (e.g., next day delivery), special instructions (e.g., fragile), pick-up date, delivery date, cost of the parcel delivery transaction, signatures of the shipper/consignee, etc.

When the common carrier 24 in FIG. 2 arrives at Fancy Store's location, as identified by the consignee address, the common carrier 24 will attempt to complete the parcel delivery transaction. For example, the driver of the common carrier's truck or another of the common carrier's employees may complete the transaction by obtaining the signature of a representative of Fancy Store 22 via a DIAD upon delivery. Or, the common carrier's employee may scan a barcode using a barcode scanner at a drop-off area (e.g., a mail room) at Fancy Store's address identifying the location as Fancy Store and may leave the parcel in the designated area. Regardless, in completing the transaction (e.g., obtaining the signature or scanning the barcode, in these examples), the common carrier has indirectly verified that the address provided for the consignee actually exists and that the address represents a valid location for the consignee to receive packages.

Referring again to FIG. 1, the information represented in each data entry stored on the database 12, including the input verifying the address, is accessible to the central server 16. In this way, the central server 16 is able to associate a particular verified address with the corresponding business entity based on the respective data entry accessed from the database 12. In the example of FIG. 2, the central server 16 would associate "Fancy Stores Drive, Chicago, Ill. 60603" with the corresponding business entity, "Fancy Store." As previously mentioned, this association may be stored in the database 12, for example, as part of the same data entry, or in another memory, such as the memory of the central server 16 itself or a server with which it communicates.

In some cases, the business entity that is certified may be the shipper 20 (e.g., Supplier Co. in the scenario above). For example, if the common carrier 24 must travel to the shipper address to pick up the parcel to be delivered, the common carrier 24 may be able to verify the shipper address and obtain input for communication to the database 12 by receiving the shipper's acknowledgement via a DIAD or by any of the other ways mentioned above. Thus, in one parcel delivery transaction, two business entities (that of the shipper and that of the consignee) may be certified as described above.

In another example, the common carrier 24 may certify a business entity that is neither the shipper nor the consignee. In this case, the driver for the common carrier 24 may encounter the location of a business entity (Pet Shoppe) 21 while conducting parcel delivery activities for the common carrier 24 (e.g., while delivering a parcel to the consignee Fancy Store 22). For example, Fancy Store 22 may be located in a strip mall where several business entities are also located (including the Pet Shoppe 21). Thus, the driver of the common carrier's vehicle may confirm that the Pet Shoppe 21 is at the listed address and may provide corresponding input (e.g., via a DIAD) so indicating while completing the delivery to Fancy Store 22.

In any case, the common carrier 24 may gather additional information regarding the business entity (Supplier Co. 20, Fancy Store 22, or Pet Shoppe 21). For example, the driver visiting the location may take a digital photograph of the storefront of the business entity. The photograph may serve as the input confirming the location of the business entity, or the photograph may supplement other data provided by the driver or the business entity used for certification purposes.

The DIAD, barcode scanner, or other device used to complete the transaction or otherwise gather the data may be configured to act as the data terminal 14 of FIG. 1 and may thus transmit the input received regarding the business entity to the database 12 via the network 18. For example, the DIAD may transmit the data wirelessly (e.g., in real time) via a cellular connection or Bluetooth® connection to another device, which may then transmit the data to the database 12 and/or the central server 16. As another example, the driver's vehicle may include a cradle for docking the DIAD, in which case information received by the DIAD may be transmitted when the DIAD is received by the cradle. Alternatively, the common carrier's employee may record the data in some other way, such as by making a notation on a form or otherwise marking the certification as complete, manually or electronically.

Providing and Using the Directory

In some cases, the common carrier may host a directory of business entities, including the certified business entities, that can be accessed and searched by users, as described below. The common carrier may provide access to some or all of the functionality of the directory to its customers at no charge. For example, customers of the common carrier (e.g., those who have established an account with the common carrier) may be provided with log in information to enable the customers to access the directory, search the listings, and access special features, such as links to additional information about selected businesses. In some cases, others who may not be customers of the common carrier may be able to access the directory and search the listings, but may not have access to the special features provided for customers.

In this regard, the central server 16 may be configured to provide for the display of the verified address, for example to indicate to a user that the corresponding business entity has been certified. Referring to FIG. 1, the system 10 may thus include other devices and servers that are connected to the communications network 18 and are capable of communicating via the network 18. For example, the system 10 may include a directory server 28 that is configured to store information regarding a number of business entities. The directory server 28 may include entries for various business entities and store data for each business such as the business entity's address, contact information, hours of operation, and so on. In some cases, the directory server 28 may be a local directory, holding information pertaining to a specified geographic region (such as a county or a certain zip code). In other cases, the directory server 28 may be a subject directory, holding information pertaining only to certain types of businesses (such as warehouses or building contractors). Thus, although FIG. 1 shows only one directory server 28, more than one directory server 28 may be connected to the communications network 18 and/or may be accessible by other servers and devices connected to the network 18, such as the central server 16.

A user terminal 30 may also be connected to the communications network 18. The user terminal 30 may be configured to receive search criteria, such as criteria specified by a user, and the user terminal 30 may further be configured to communicate with the directory server 28 or other sources of data to display a list of business entities according to the criteria specified. The user terminal 30 may also be configured to communicate with the central server 16 to display an indication of the verified address for each certified business entity displayed.

Figure 3:
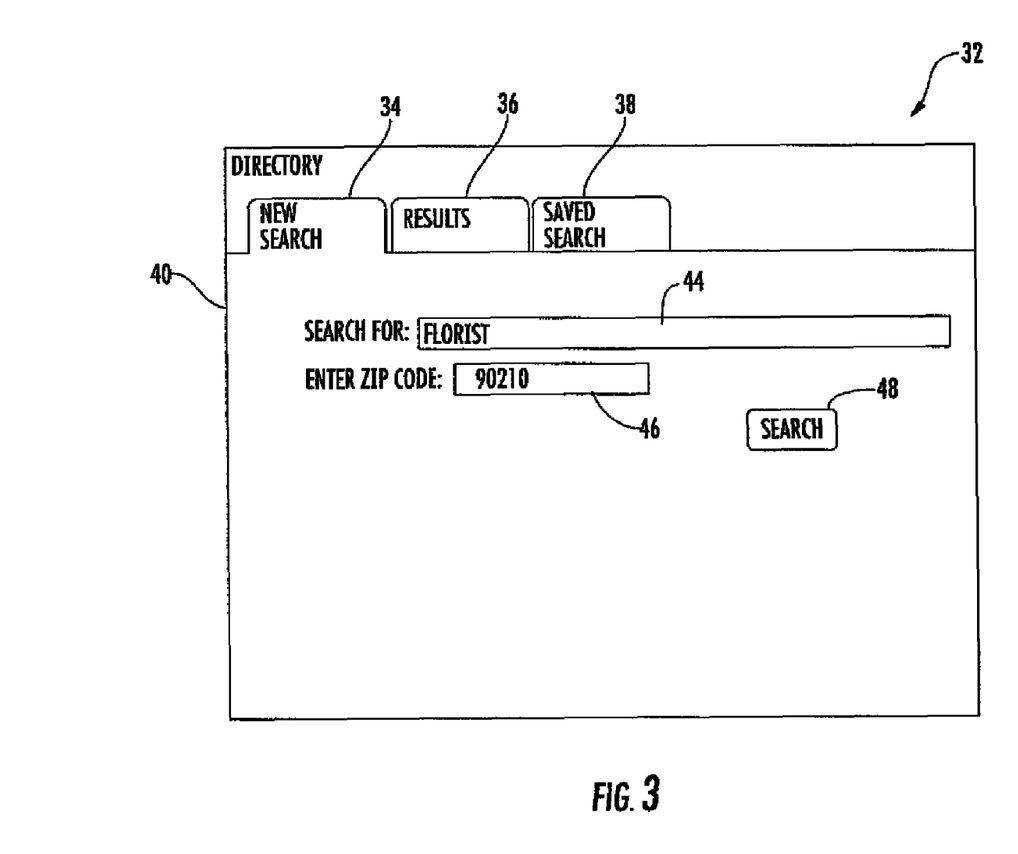
FIG. 3 illustrates a screenshot of an exemplary directory application in which search criteria is received according to an exemplary embodiment of the present invention.

For example, the user terminal 30 may be a computer located at a user location (such as an individual's home or place of business) that is capable of executing software (e.g., a web browser) that provides for the display of a Directory 32 with which the user can interact, as shown in FIG. 3. The user may be an individual consumer or a business entity. The Directory 32 may include various tabs for allowing a user to navigate and access different features of the application (depending, in some cases, on the type of access granted to the user, e.g., as a customer or as a non-customer). For example, the Directory 32 shown in FIGS. 3 and 4 has three (3) tabs 34, 36, 38 for navigation between a New Search window 40 (shown in FIG. 3), a Results window 42 (shown in FIG. 4), and a Saved Search window (not shown). Under the New Search tab 34, the New Search window 40 is displayed and allows a user to enter search criteria for identifying a particular business entity and information related to the business. The results of the search may in turn be displayed in the Results window 42, accessible via the Results tab 36. Other functionality may be provided via additional tabs, such as a Saved Search tab 38, for example, that provides access to a list of previous searches conducted by the user.

As an example, a user, such as the director of a banquet hall, may be interested in finding a local florist to handle floral arrangements for the banquet hall's events. The user may access the New Search window 40 shown in FIG. 3 and enter the search criteria "florist" in a search text input field 44. Additional search fields may be provided to narrow the search, such as a zip code field 46 that limits the search to business entities located in the specified zip code. Thus, by entering the zip code "90210," the user would be able to search for florists with an address in the 90210 zip code area.

Once the user has entered the desired search criteria, the user can initiate the search, such as by clicking or otherwise selecting a "search" button 48. The results of the search may then be displayed in the same window or in a new window. For example, the results may be provided under the Results tab 36 that displays a Results window 42, shown in FIG. 4. The results may include a listing 50 of each business entity that matches the search criteria entered by the user, along with various items of information related to each entry. Continuing with the above example, the user's search for florists in the 90210 zip code area may yield three (3) results: Best Florist, Ordinary Florist, and Super Florist. The results may be displayed in any order, and in some cases the user may be able to input a preference for the display of the results. For example, the results may be arranged alphabetically according to the name of the business entity (as shown), by distance from a certain location entered by the user, by relevancy (e.g., how closely the result matched the search criteria), or by legitimacy (e.g., listing those entries having a verified address or a higher legitimacy rating first).

Figure 4:
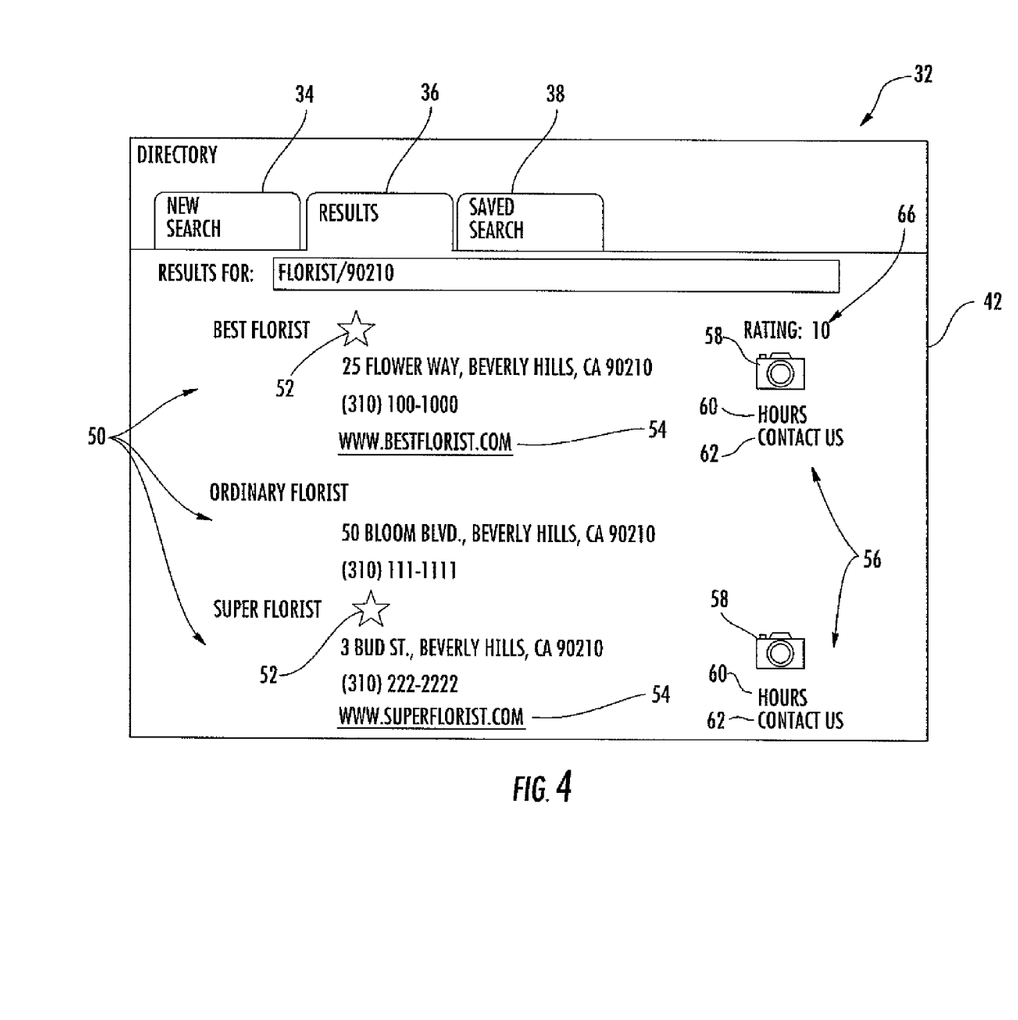
FIG. 4 illustrates a screenshot of the exemplary directory application of FIG. 3 in which results of the search are displayed according to an exemplary embodiment of the present invention.

Each listing 50 may include the name of the business entity, the address, and one or more telephone numbers, among other items of information. In some cases where the business entity has been certified as described above, the verified address may be displayed, along with an indication that the business entity has been certified (e.g., the address is indeed verified). Such an indication may include, for example, an icon 52 (such as a star or other symbol), a link to the business entity's website 54, a listing of additional information regarding the business entity 56, or a combination of these features, as shown in FIG. 4. In FIG. 4, Best Florist and Super Florist are certified business entities and include a certification indication in the form of an icon 52, as well as respective links to, for example: (1) each florist's website 54; and (2) additional information 56, such as a photograph of the business' brick-and-mortar storefront (the link here is represented by the camera icon 58), the business' hours of operation 60, and the business entity's e-mail address 62. In some cases, for example, selecting the "Contact Us" link 62 serves to initiate an e-mail application on the user terminal 30 and opens a new e-mail message addressed to the business entity for the user to complete and send. In some cases, additional information may be displayed when the user selects a certified business entity, such as by clicking on the name of the certified business entity (e.g., Best Florist or Super Florist, in this example) or the indication (e.g., the icon 52). As mentioned above, in some embodiments, some of this information may only be available to a user who is a customer of the common carrier hosting the directory.

The information provided may reside on any one or more of the devices and servers connected to the network 18 shown in FIG. 1 or other networks in communication with the network 18. For example, some of the information displayed may be stored on the central server 16, some may be stored on the directory server 28, some may be stored in the database 12, and some of the information may reside on one or more other servers 64, such as a particular business entity's server.

Evaluating the Business Entity

Based on the data gathered by the common carrier (e.g., the drivers of the common carrier's fleet of parcel delivery vehicles), the common carrier may determine a validity of one or more of the business entities. In some cases, the association of the business entity with a driver-verified address may provide validation of the business entity, as described above. Alternatively, or in addition, the validity may be determined by analyzing the data collected regarding a particular business entity.

In this regard, referring to FIG. 1, the central server 16 in some embodiments may be configured to determine a rating indicative of the legitimacy of the business entity. The rating may be a number, such as a number on a scale of 1 to 10 or a credit score, indicating (in relative terms) the legitimacy of the business entity. Alternatively, the rating may be a word descriptor (such as "Fair" or "Good"), a symbol or code (such as a series of stars, with more stars indicating a better rating, for example), a color (such as the font color used for the business entity's name), or any other type of rating that can indicate to a user the degree of legitimacy of a particular business entity relative to other business entities. In FIG. 4, the rating for Best Florist is a number rating 66 that uses a 1-10 scale, with 10 being the highest rating.

The rating may be determined in various ways. For example, the rating may be based on a total number of parcel delivery transactions involving the business entity over a predetermined period of time. In one scenario, a business entity that has had 100 parcel delivery transactions in the past year may be rated higher than a business entity that has had only 15 parcel delivery transactions in the past year. In another example, historical data may be analyzed to discern a trend in the parcel delivery transactions (e.g., executed via a particular carrier) over a predetermined period of time of the business entity.

Figure 5:
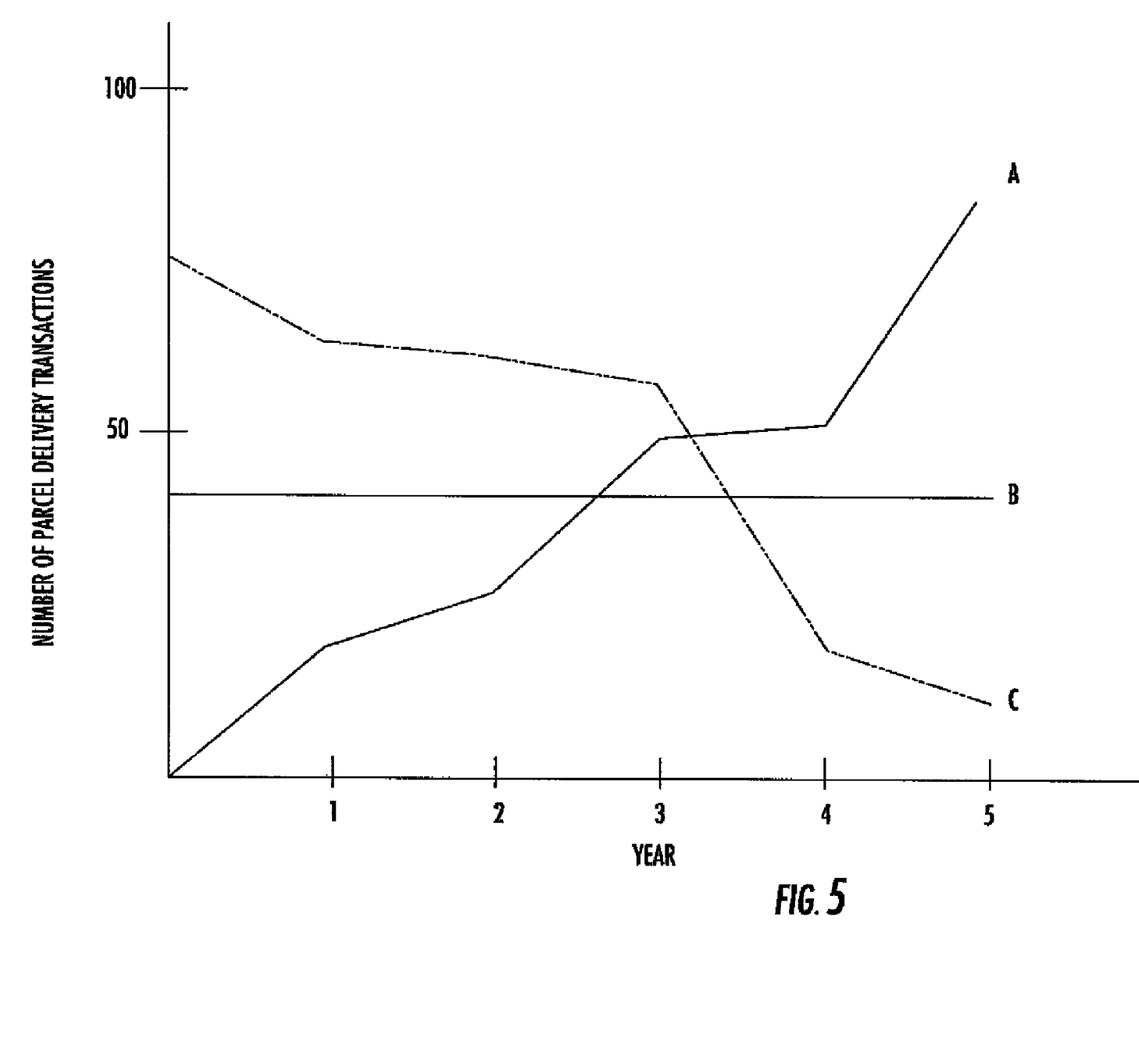
FIG. 5 illustrates an example of trends in parcel delivery transactions for three exemplary business entities according to an exemplary embodiment of the present invention.

For example, a trend showing the increasing volume of parcel delivery transactions (e.g., executed by a particular carrier) may correspond to a rating indicating a greater legitimacy of the business entity. Thus, referring to FIG. 5, Business Entity A, which has been involved in an increasing number of parcel delivery transactions over the past 5 years, may be rated higher than Business Entity B, which has had a constant number of parcel delivery transactions. Furthermore, both A and B may be rated higher than Business Entity C, which has had a steadily decreasing number of parcel delivery transactions over the same amount of time, perhaps indicating a decline in Business Entity C's business. Similarly, a trend showing the increasing frequency of parcel delivery transactions may correspond to a rating indicating a greater legitimacy of the business entity. Thus, a business entity that has gone from engaging a particular common carrier to deliver parcels, for example, twice a week to engaging the common carrier to deliver parcels four times a week may be rated higher than another business entity that has slipped from using the common carrier twice a week to using the common carrier only once a week. In addition to volume and frequency, trends in the value of the common carrier's services used may also be taken into account when determining the rating.

Other factors that may be used to determine the rating may include the length of time over which the business entity has been involved in parcel delivery transactions with a specific common carrier (e.g., the common carrier determining the rating), as well as the geographic scope of the business entity. For example, a business entity that has been involved in parcel delivery transactions using a particular common carrier for 30 years may receive a higher rating than a business entity that has only been involved in parcel delivery transactions using that same common carrier for the past two years. The geographic scope of the business entity may be determined based on the location of the entities the particular business entity ships parcels to and/or receives parcels from. For example, a business entity that ships parcels to and/or receives parcels from locations in multiple states using the particular common carrier may be rated higher than a business entity that only ships to/receives parcels from entities in the same state. Likewise, a business entity that ships parcels to and/or receives parcels from locations in North America, Europe, and Asia may receive a higher rating than a business entity that is not as global and only transacts business with entities in North America (e.g., as indicated by the business entity's parcel shipment activities). Similarly, a business entity that ships parcels to and/or receives parcels from 128 different countries may be rated higher than a business entity that ships parcels to and/or receives parcels from only 5 countries, worldwide.

Numerous other factors may be used to determine the rating, independently or in combination with the factors mentioned above. Such other factors may include the identity of the entities with which the business entity transacts business, the number of entities with which the business entity transacts business, and the total value of the parcels delivered to or from the business entity, among other factors. Thus, by analyzing data collected over a period of time regarding a particular business entity, a common carrier can determine the validity of a particular business entity (for example, in the form of the rating described above) for which the common carrier delivers parcels.

The central server 16 of FIG. 1 may be configured to access the database 12 to obtain data for determining the rating. For example, historical information regarding the parcel delivery transactions involving a particular business entity (such as the total number of deliveries made over the past five years) may be stored in the database 12 and accessed by the central server 16 in order to determine the rating. Alternatively, or in addition to accessing the database 12, the central server 16 may be configured to access one or more supplementary servers 64 for obtaining the information needed to determine the rating. As mentioned above, the supplementary server may be the directory server 28, or some other server such as a server maintained by the particular business entity or a server maintained by the common carrier.

Each of the factors described above may be used alone to determine the rating or may be combined with another factor (including factors not listed above) or otherwise manipulated to determine the rating. For example, the central server 16 of FIG. 1 may be configured to apply an algorithm to one or more of the factors in order to determine the rating. One possible algorithm may, for example, assign a score to two or more of the above factors and combine the scores to determine a rating. In some cases, the scores may be based on a comparison of the statistics for the business entity being rated with other business entities for which data is available. In another example, each factor considered may receive a score based on a comparison with a standardized factor (e.g., representing a "typical" legitimate business entity). The scores may then be combined to determine a rating according to some predetermined function. Numerous other factors, algorithms, and methodologies may be used to determine the rating, and the rating, once determined, may be updated and modified as necessary, for example to reflect changes in the situation of a business entity.

The rating, as determined by the central server 16, may be displayed via the application described above so that a user can evaluate the legitimacy of the associated business entity. For example, the search results that are displayed in a Search Results window 42 such as the one shown in FIG. 4 may include a listing of the rating 66. In some embodiments, however, input may be received from the business entity regarding whether to display its rating. Referring to FIG. 1, a user terminal 30 operated by a particular business entity may be configured to receive a preference from the business entity regarding the display of its rating, and the central server 16 may be configured to provide for the display of the respective business entity's rating according to the preference. For instance, the business entity may have an account with the administrator of the Directory (which may in some cases be the common carrier) and may be able to enter its preference via the administrator's website, by otherwise contacting the administrator, or by interacting with the Directory application itself.

Using the example of FIG. 4, Best Florist may enter a preference to display its rating of 10 (out of 10) via the user terminal by inputting the preference on the Directory administrator's website. As a result, the business entity's rating 66 may be displayed as a part of its listing 50 whenever its listing 50 is displayed to a user. Super Florist, on the other hand, may have received a rating of 3 (out of 10). Thus, Super Florist may enter a preference not to display its rating, in which case the rating would not be shown as part of Super Florist's listing 50. In this way, potential customers of Super Florist may be less likely to think negatively of Super Florist due to the low rating and may still view the indication(s) 52, 54 that Super Florist is a certified business entity. Furthermore, in some cases, the rating may only be accessible to users who are also customers of the directory provider.

In other embodiments, a method for certifying a business entity is provided. Referring to Block 100 of FIG. 6, input is received regarding a location of the business entity visited as part of a parcel delivery transaction. As described above, the input may be received automatically, for example as a result of obtaining the business entity's signature upon receiving a parcel (e.g., via a handheld device, such as a DIAD), or manually, such as when an employee of the common carrier (e.g., the driver making the delivery) provides input indicating that the delivery was successfully completed at the specified address or confirming that the business entity is located at a particular address in the process of conducting other parcel delivery activities, as described above. In Block 102, the business entity is then associated with a verified address corresponding to the location visited. In this way, the verified address corresponds to a physical location at which the business entity is actually doing business in some capacity and is able to receive parcels.

The verified address may be displayed in some cases, along with an indication that the business entity has been certified, as shown in Block 104. This may be done through the execution of a software application that generates listings of various business entities for a user, such as the listings 50 shown in FIG. 4. In some cases, the user may be able to navigate and select aspects of the information displayed (e.g., the verified address) via a web-based interface, as discussed above. In this regard, the indication displayed may include at least one feature such as an icon, a link to the business entity's website, and/or a listing of additional information regarding the business entity (such as the hours of operation).

Figure 6:
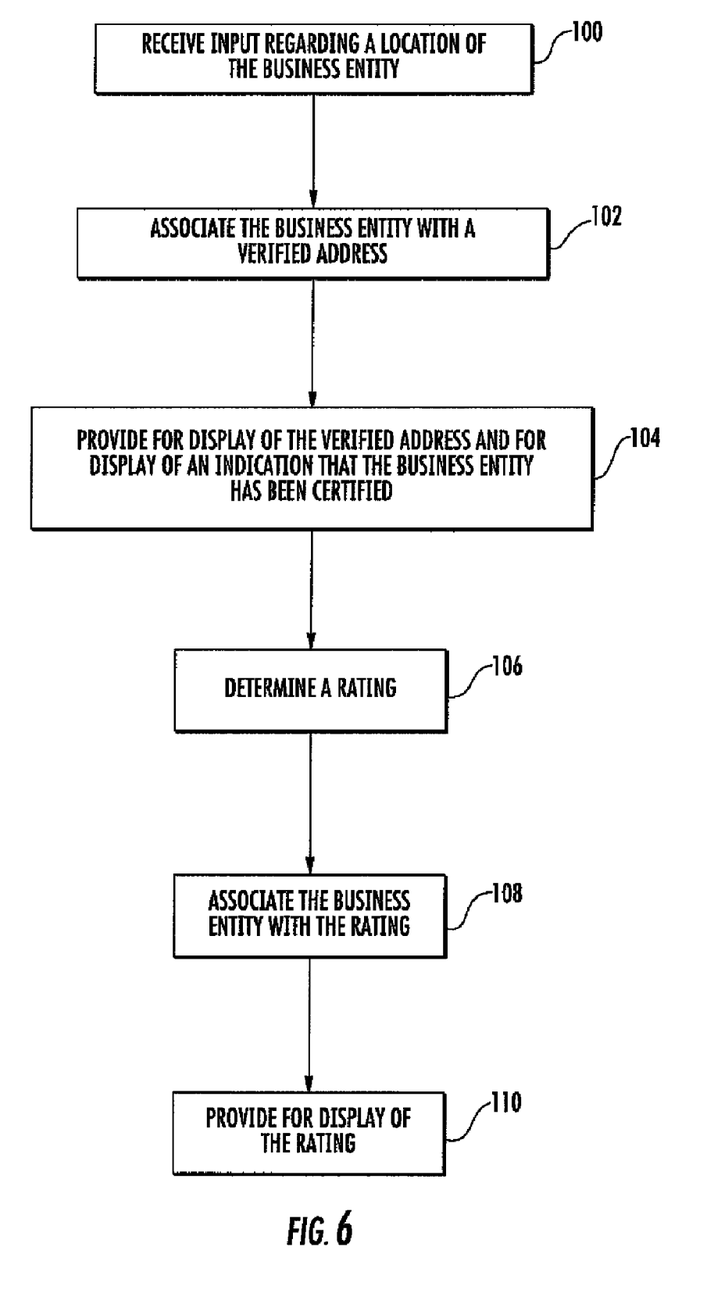
FIG. 6 is a block diagram according to an exemplary method for certifying a business entity according to an exemplary embodiment of the present invention.

Turning to Blocks 106-110 of FIG. 6, in some embodiments, the common carrier may determine a rating for the business entity, where the rating is indicative of the legitimacy of the business entity. The business entity is then associated with the rating, and display of the rating is provided for. The rating may be determined in many ways. For example, determining the rating may involve accessing information regarding parcel delivery transactions involving the business entity. In some cases, the accessed information may be used to calculate a total number of parcel delivery transactions involving the business entity over a predetermined period of time (such as over the last year or five years, or over the total period of time that the business entity has been conducting business). In other cases, the accessed information may be analyzed to discern a trend in parcel delivery transactions involving the business entity over a predetermined period of time, or to calculate a length of time over which the business entity has been involved in parcel delivery transactions (e.g., the total time during which the business entity has been a customer of a specific common carrier). Furthermore, the accessed information may be analyzed to determine a geographic scope of the business entity based on a location of at least one entity that the business entity has engaged in parcel delivery transactions, as previously described.

In various embodiments, in providing for the display of the rating, input may be received from the business entity regarding whether to display the rating. For example, the business entity may specify via the web-based interface or other application that the business entity does not want its rating included in its listing of information for others to see. This may be, for example, because the business entity does not agree with the method used to rate business entities, or because the business entity did not receive a good rating and prefers that others not be discouraged from doing business with the business entity upon viewing the rating. In any case, the rating would not be displayed based on the business entity's preference not to display the rating. Alternatively, a business entity that is proud of its rating or otherwise prefers to have its rating displayed may communicate such a preference. The rating would thus be displayed based on such input.

The steps described above need not occur in the order shown in FIG. 6 or discussed above. Rather, the steps may occur in any order according to the configuration of the system and the preferences of the administrator of the Directory application. For example, in some cases, input regarding whether to display the rating may be received prior to the determination of the rating. In this way, a business entity may be able to "opt out" of being rated all together in addition to choosing not to have its rating displayed.

Exemplary embodiments of the present invention have been described above with reference to block diagrams and flowchart illustrations of systems, methods, and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus, such as a processor of the central server 16, data terminal 14, directory server 28, supplementary server 64, and/or user terminal 30 (all shown in FIG. 1), to function in a particular manner, such that the instructions stored in the computer-readable memory produce an article of manufacture including computer-readable instructions for implementing the function specified in the flowchart block or blocks illustrated in FIG. 6. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of certifying a business entity comprising:
receiving, from a driver of a parcel delivery vehicle, input regarding a location of the business entity, wherein each vehicle is conducting parcel delivery transactions as part of a parcel delivery route in which one or more parcels are picked up from consignors or delivered to consignees, and the business entity is at least one of a consignor, consignee, or an entity visited as part of carrying out the parcel delivery route;
associating the business entity with a verified address corresponding to the location visited;
determining a rating indicative of a legitimacy of the business entity, wherein the legitimacy of the business entity represents that the business entity exists and is independent of a quality of goods or services rendered by the business entity, and wherein the rating is at least partly determined by accessing information regarding previous parcel delivery transactions involving the business entity;
associating the business entity with the rating; and
providing for a display of the rating to a user, wherein the rating indicative of the legitimacy of the business entity provides an indication of a validity of the business entity for allowing the user to determine whether to engage the business entity in business transactions.

2. The method of claim 1, wherein the business entity is other than the consignor or consignee.

3. The method of claim 1 further comprising providing for a display of the verified address and providing for a display of an indication that the business entity has been certified.

4. The method of claim 3, wherein the indication comprises at least one feature selected from the group consisting of an icon, a link to the business entity's website, and a listing of additional information regarding the business entity.

5. The method of claim 1, wherein determining the rating further comprises calculating a total number of the parcel delivery transactions involving the business entity over a predetermined period of time.

6. The method of claim 5, wherein the predetermined period of time comprises a total length of time over which the business entity has been conducting business.

7. The method of claim 1, wherein determining the rating further comprises discerning a trend in the parcel delivery transactions involving the business entity over a predetermined period of time.

8. The method of claim 1, wherein determining the rating further comprises calculating a length of time over which the business entity has been receiving parcels or delivering parcels via at least one common carrier.

9. The method of claim 1, wherein determining the rating further comprises determining a geographic scope of the business entity based on a location of at least one entity with which the business entity has engaged in at least one parcel delivery transaction.

10. The method of claim 9, wherein the geographic scope is determined based on a number of cities, a number of states, or a number of countries with which the business entity has engaged in parcel delivery transactions.

11. The method of claim 1, wherein providing for the display of the rating comprises receiving input from the business entity regarding whether to display the rating.

12. The method of claim 1, wherein the input comprises a photograph of a storefront of the business entity that is taken by the driver.

13. The method of claim 1, wherein the delivery vehicle is associated with a common carrier, and wherein the input comprises data regarding parcel deliveries to or from the business entity using the common carrier.

14. The method of claim 1, wherein receiving input comprises receiving input via a handheld wireless device.

15. The method of claim 14, wherein receiving input comprises receiving input via a Delivery Information Acquisition Device (DIAD).

16. The method of claim 1, wherein determining the validity comprises analyzing input received over a period of time regarding the business entity.

17. The method of claim 1 further comprising providing a business directory that includes a listing of a plurality of certified business entities and the determined rating indicative of the legitimacy of at least one of the certified business entities.

18. A computer program product comprising at least one computer-readable storage medium having computer-readable program code portions stored therein, the computer-readable program code portions comprising:
a first executable portion for receiving input from a driver of a parcel delivery vehicle regarding a location of the business entity, wherein each vehicle is conducting parcel delivery transactions as part of a parcel delivery route in which one or more parcels are picked up from consignors or delivered to consignees, and the business entity is at least one of a consignor, consignee, or an entity visited as part of carrying out the parcel delivery route;
a second executable portion for associating the business entity with a verified address corresponding to the location visited;
a third executable portion for determining a rating indicative of a legitimacy of the business entity, wherein the legitimacy of the business entity represents that the business entity exists and is independent of a quality of goods or services rendered by the business entity, and wherein the rating is at least partly determined by accessing information regarding previous parcel delivery transactions involving the business entity;
a fourth executable portion for associating the business entity with the rating; and
a fifth executable portion for providing for a display of the rating to a user, wherein the rating indicative of the legitimacy of the business entity provides an indication of a validity of the business entity for allowing the user to determine whether to engage the business entity in business transactions.

19. The computer program product of claim 18 further comprising a sixth executable portion for providing for a display of the verified address and providing for a display of an indication that the business entity has been certified.

20. The computer program product of claim 18, wherein the third executable portion is further configured for calculating a total number of the parcel delivery transactions involving the business entity over a predetermined period of time.

21. The computer program product of claim 20, wherein the predetermined period of time comprises a total length of time over which the business entity has been conducting business.

22. The computer program product of claim 18, wherein the third executable portion is further configured for discerning a trend in the parcel delivery transactions involving the business entity over a predetermined period of time.

23. The computer program product of claim 18, wherein the third executable portion is further configured for calculating a length of time over which the business entity has been receiving parcels or delivering parcels via at least one common carrier.

24. The computer program product of claim 18, wherein the third executable portion is further configured for determining a geographic scope of the business entity based on a location of at least one entity with which the business entity has engaged in at least one parcel delivery transaction.

25. The computer program product of claim 24, wherein the geographic scope is determined based on a number of cities, a number of states, or a number of countries with which the business entity has engaged in parcel delivery transactions.

26. A system for certifying a business entity comprising:
a database connected to a communications network and configured to store a plurality of data entries regarding parcel delivery transactions, wherein each data entry includes at least one item of information selected from the group consisting of a shipper name, a shipper address, a consignee name, and a consignee address associated with a respective parcel delivery transaction;
at least one data terminal connected to the communications network and configured to receive and transmit input from a driver of a parcel delivery vehicle verifying an address of a business entity, wherein each vehicle is conducting parcel delivery transactions as part of a parcel delivery route in which one or more parcels are picked up from consignors or delivered to consignees and the business entity is at least one of a consignor, consignee, or an entity visited as part of carrying out the parcel delivery route; and
a central server connected to the communications network and configured to access the database, wherein the central server is further configured to associate the verified address with the corresponding business entity based on the data entries accessed from the database, to determine a rating indicative of a legitimacy of the business entity, wherein the legitimacy of the business entity represents that the business entity exists and is independent of a quality of goods or services rendered by the business entity, and wherein the rating is at least partly determined by accessing information regarding previous parcel delivery transactions involving the business entity, to associate the business entity with the rating, and to provide for a display of the rating to a user, wherein the rating indicative of the legitimacy of the business entity provides an indication of a validity of the business entity for allowing the user to determine whether to engage the business entity in business transactions.

27. The system of claim 26, wherein at least one of the at least one data terminals is a Delivery Information Acquisition Device (DIAD).

28. The system of claim 26 further comprising:
a directory server connected to the communications network and configured to store information regarding a plurality of business entities; and
a user terminal connected to the communications network and configured to receive search criteria, wherein the user terminal is configured to communicate with the directory server to display a list of business entities according to the criteria, and wherein the user terminal is configured to communicate with the central server to display an indication of the verified address for each certified business entity displayed.

29. The system of claim 28, wherein a user is able to interact with the user terminal to select at least one of the certified business entities displayed, wherein selection of the certified business entity causes the display of additional information regarding the selected business entity.

30. The system of claim 28, wherein the user terminal is configured to receive a preference from the business entity regarding the display of the respective business entity's rating, and wherein the central server is configured to provide for a display of the respective business entity's rating via the user terminal according to the preference.

31. The system of claim 26, wherein the central server is configured to determine the rating indicative of the legitimacy of the business entity based on at least one factor selected from the group consisting of:
a total number of parcel delivery transactions involving the business entity over a predetermined period of time;
a trend in the parcel delivery transactions involving the business entity over a predetermined period of time;
a length of time over which the business entity has been involved in parcel delivery transactions; and
a geographic scope of the business entity based on a location of at least one entity with which the business entity has engaged in at least one parcel delivery transaction.

32. The system of claim 31, wherein the trend of an increasing volume of parcel delivery transactions corresponds to a rating indicating a greater legitimacy of the business entity.

33. The system of claim 31, wherein the trend of an increasing frequency of parcel delivery transactions corresponds to a rating indicating a greater legitimacy of the business entity.

34. The system of claim 26, wherein the central server is configured to access the database to determine the rating.

35. The system of claim 26, wherein the central server is configured to access at least one supplementary server to determine the rating.

* * * * *